Sept. 9, 1924.

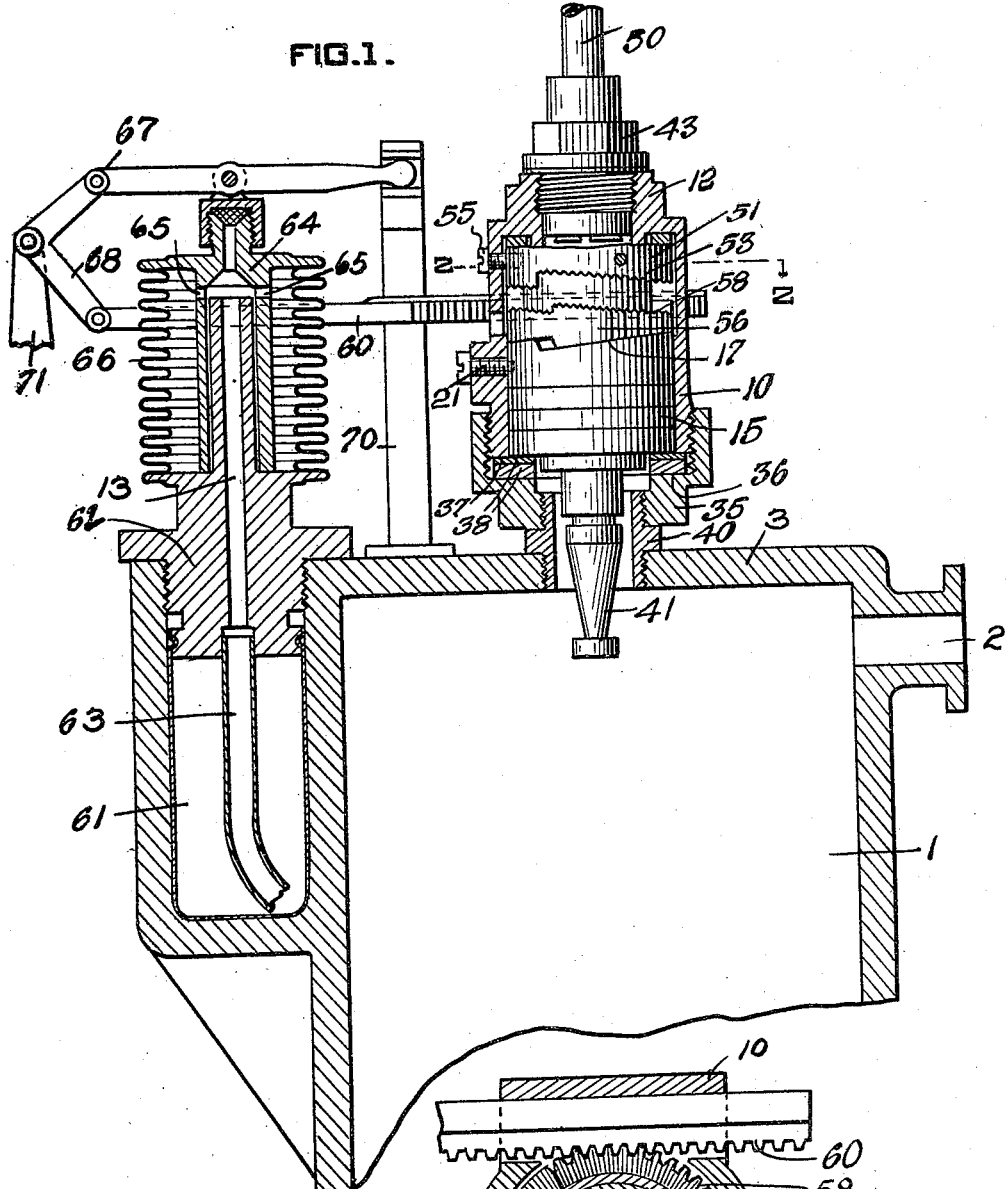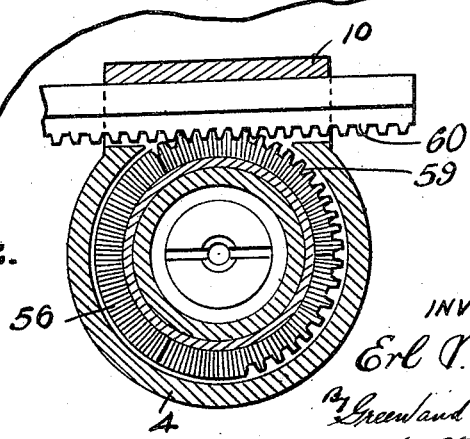

E. V. BEALS 1,508,153

INTERNAL COMBUSTION ENGINE

Filed June 26, 1920

2 Sheets-Sheet 2

WITNESSES
J. Herbert Bradley.

INVENTOR
Erl V. Beals
By Green & McCallister
His Attorneys

Patented Sept. 9, 1924.

1,508,153

UNITED STATES PATENT OFFICE.

ERL V. BEALS, OF BOSTON, MASSACHUSETTS.

INTERNAL-COMBUSTION ENGINE.

Application filed June 26, 1920. Serial No. 391,933.

*To all whom it may concern:*

Be it known that I, ERL V. BEALS, a citizen of the United States, and a resident of Boston, in the county of Suffolk and State of Massachusetts, have made a new and useful invention in Internal-Combustion Engines, of which the following is a specification.

This invention relates to internal combustion engines of the type in which water is injected into the cylinder periodically for the purpose of cooling the cylinder, increasing the thermal efficiency of the engine, conserving fuel and enabling the engine to utilize lower grade fuels.

It is obvious that with different loads on the engine and with different atmospheric conditions, varying quantities of water should be injected into the cylinder and the object of this invention is to provide thermostatic means for proportioning the injections according to the temperature of the engine cylinder.

In Patent No. 1,434,801, issued to me on Nov. 7, 1922, I have described an injection device having a chamber adapted to contain water, a displacer actuated from the pressure derived from the combustion space for forcing water from said chamber, a positive stop for limiting the injecting movements of the displacer and means operated by pressure for moving said stop to vary the amount of water injected. In a co-pending application Ser. No. 348,606, I have described a water injecting device similar to the device of said patent, but in which the stop for limiting the injecting movement of the displacer is rotatable and the amount of water injected is determined by rack and pinion elements which are controlled by a flexible diaphragm moved to different positions by the pressure in the cylinder intake manifold.

Figure 3:
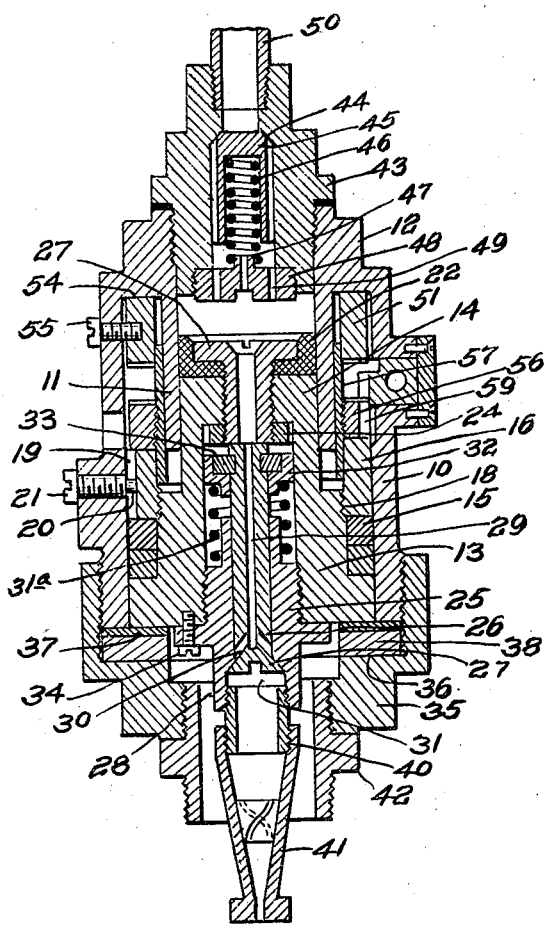
Figure 4:
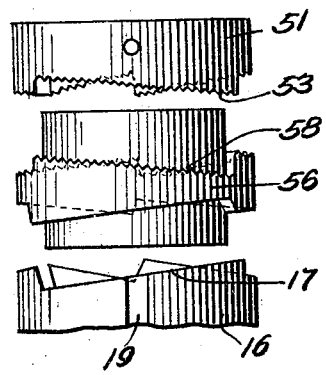

In the present invention, I utilize the injection device of said patent and the rotatable stop of said pending application up to and including the rack and pinion elements but I operate these latter elements by a thermostat instead of a pressure controlled diaphragm and in the accompanying drawings, Figure 1 is a vertical section thru an engine cylinder and the water injecting device referred to and showing the thermostatic control, Fig. 2 is a horizontal section thru the injection device on line 2—2 of Fig. 1, Fig. 3 is a sectional elevation of my water injector device shown in Fig. 1 and Fig. 4 is a view in elevation of the cooperating wedge members used for limiting the movements of the displacer element.

The engine cylinder 1 has an intake valve 2 and a threaded opening for the accommodation of the water injecting device 4 here shown as positioned on the top wall 3 of the cylinder. The injecting device is described in detail in the above mentioned application and will be briefly described herein as including a shell or housing 10 bored internally and provided with an annular flange 11 depending from the head portion 12 of the shell. The flange is externally and internally finished on surfaces concentric with the main bore of the shell. A displacer element 13, at its lower end fitted to slide within the bore of the shell, is reduced at its upper end 14 so as to fit the internal bore of the annular flange 11.

The lower or larger part of displacer 13 is provided with metallic packing rings 15 held in place by means of a nut 16, the upper surface of which is machined so as to present three equal cam or wedge faces 17. The nut or wedge member 16 is threaded at 18 onto displacer member 13 and at one or more places at its outer surface is provided with longitudinally extending slots 19 within which the reduced end 20 of guiding screw 21 is adapted to lie so as to prevent rotation of the displacer element during its reciprocations.

Displacer element 13 is centrally bored and at its upper end carries a cup leather packing 22 held in place by means of a hollow retaining screw 23 threaded into the upper tapped end of the central bore of the displacer member and lock nut 24 is threaded to the inner end of the screw 23 for locking the same in place.

One element 25 of a water discharge valve is threaded into the lower tapped end of the central bore of the displacer element. Element 25 is centrally bored to receive a valve stem 26 which carries at its lower end a valve 27 cooperating with a seat 28 formed in element 25. Valve stem 26 is provided with a central opening 29 for the passage of water and this communicates with outlets 30 through which water passing through the valve stem is discharged into space 31 when valve 27 is unseated.

Valve 27 is normally held to its seat by means of a coil spring 31ª which supports the upper reduced end of valve element 25 and bears at its upper end against a collar 32 secured to the upper end of valve stem 26 by means of a split washer 33, as is now common in certain constructions. A screw 34 is utilized for preventing valve member 25 from turning out of its threads in the displacer element 13. The shell 10 at its lower end is externally threaded to receive a cap 35 and between the inner face 36 of the cap and the lower end 37 of the shell two buffer elements 38 are located. These are annular ring-like washers and are preferably made from material such as fabric, vulcanite or bakelite, (a phenolic condensation product) for more or less cushioning the return or inner movements of the displacer element 13. The cap 35 is provided with a threaded bore adapted to receive a connecting nipple 40 for connecting the device to the cylinder of the engine and a spray nozzle 41 of any desired construction is connected to the outlet of valve member 25 by means of a nipple 42.

The upper end of shell 10 which is bored through is tapped to receive a plug 43 which forms the bore of a non-return valve device. The plug is provided with a a seat 44 with which a valve plunger 45 cooperates. Plunger 45 is bored out to receive a coiled spring 46 which at its lower end encircles tip 47 of a nut 48 threaded into the lower end of plug 43 and which is provided with through-openings 49 for the passage of water. By means of suitable piping 50 the device is adapted to be connected with a source of supply of water under sufficient pressure to move displacer element 13 outwardly into contact with buffer element 38 at the end of the expansion strokes of the engine or during the exhaust strokes.

A wedge or cam member 51, annular in form lies between annular flange 11 and shell 10 and has its lower face formed in the nature of three identical cam or wedge faces 53 provided with fine serrations as shown in Figs. 1, 3 and 5. This cam member 51 is held in fixed position against end surface 54 of the shell by means of a plurality of screws 55, only one of which is shown.

Lying between cam members 16 and 51 is a slidable and revolvable cam member 56. This is annular in form and is rigidly secured by means of screw threads to sleeve 57 which slides on the outer cylindrical surface of the annular flange 11, and between said surface and the inner cylindrical faces of cam members 16, and 51. The lower face of cam member 56 is provided with three identical cam faces adapted to cooperate with cam faces 17 of the member 16. The upper surface of cam member 56 is provided with three identical cam faces 58 which are serrated in the same manner as the cam faces 53 and which are arranged to cooperate with the serrations of the said cam faces 53.

A portion of the outer cylindrical portion of the cam member 56 is provided with gear teeth 59 and with these the teeth of a rack member 60 mesh. Rack member 60 is adapted to slide at right angles to the axis of displacer member 13 and in so doing will rotate cam member 56 and cause its lower cam faces to ride on cam faces 17 of the cam member 16, thereby varying the effective distance between cam member 16 and cam member 51.

The form of the apparatus illustrated at the left hand side of Fig. 1 is to reciprocate the rack 60 according to the cylinder temperature. The side wall of cylinder 1 is provided with an integral pocket 51, threaded at the top to receive the base 62 of a bulb thermostat of familiar type, the bulb of which is inserted in pocket 61.

When heat is radiated from the cylinder 1, the fluid contained in the bulb expands and by means of a passage 63 is admitted to the face of a piston 64 slidably mounted on the base 62. Ports 65 in piston 64 communicate with a bellows-like chamber 66 which provides greater piston area and increased power. Sliding movement of piston 64 is translated into sliding movement of rack 60 through a lever 67 and a bell crank 68. The lever 67 is fulcrumed on a standard 70 mounted on the upper wall 3 of the cylinder and the bell crank 68 is fulcrumed on a standard 71 having any suitable fixed mounting (not shown).

High temperatures in cylinder 1 expand the fluid in pocket 61, raise the piston 64, lever 67 and the horizontal arm of bell crank 68 and move the vertical arm of the bell crank and the rack 60 to the right, rotating cam 56 in a clockwise direction to the position shown in Figs. 1 and 2 which provides maximum vertical travel of cam 16 and consequently maximum water injection. Lower temperatures in the cylinder will be followed by travel of the cam 66 in an anti-clockwise direction, decreased travel of cam 16 and the injection displacement piston and a reduction in the volume of water injected.

I prefer to locate pocket 11 adjacent the cylinder exhaust valve, thereby subjecting the thermostat to the highest temperatures produced. This location, however, is not essential.

While I have shown a device as applied to a single cylinder I do not intend to use it so exclusively. The thermostat control may be positioned in the wall between two cylinders of a multi-cylinder engine and all the cylinder injection devices regulated by the movement of a common rack bar controlled by a single thermostat.

I claim:—

1. In combination with an internal combustion engine, a device for injecting water into the engine cylinder comprising a chamber adapted to contain water, an explosive pressure actuated displacer, a positive stop for said displacer and means the operation of which is dependent upon the temperature of the cylinder walls for controlling the travel of said displacer.

2. In combination with the cylinder of an internal combustion engine, a water injecting device comprising a chamber adapted to contain water, an explosive pressure actuated displacer, a stop for positively limiting the injecting movements of said displacer and thermostatically operated means for shifting said stop.

3. In combination with the combustion space of an internal combustion engine, a chamber adapted to contain liquid, a displacer actuated by the pressure derived from said space for ejecting liquid from said chamber, a positive stop for limiting the ejecting movements of said displacer and thermostatically operated means for limiting the amount of liquid injected.

In testimony whereof I have hereunto subscribed my name this 22nd day of June, 1920.

ERL V. BEALS.